United States Patent
Wiegand et al.

[11] Patent Number: 6,143,046
[45] Date of Patent: Nov. 7, 2000

[54] FILTER CARTRIDGE HAVING VIBRATABLE DIAPHRAGM

[75] Inventors: Hans Wiegand, Fürth; Uwe Visel, Birkenau, both of Germany

[73] Assignee: Firma Carl Freudenberg, Weinheim, Germany

[21] Appl. No.: 09/150,468

[22] Filed: Sep. 9, 1998

[30] Foreign Application Priority Data

Sep. 9, 1997 [DE] Germany .......................... 197 39 510

[51] Int. Cl.⁷ .................................................. B01D 27/10
[52] U.S. Cl. ........................ 55/309; 210/130; 210/349; 210/448; 210/452; 210/493.1; 210/493.2; 210/493.5
[58] Field of Search ................... 210/130, 323.2, 210/349, 354, 356, 409–412, 452, 445, 450, 453, 448, 493.1, 493.2, 493.5; 55/309, 310

[56] References Cited

U.S. PATENT DOCUMENTS

| | | |
|---|---|---|
| 3,680,659 | 8/1972 | Kasten ........................................ 55/310 |
| 4,287,917 | 9/1981 | Frey ......................................... 210/446 |
| 4,300,928 | 11/1981 | Sugie et al. . |
| 4,557,829 | 12/1985 | Fields ...................................... 210/509 |
| 5,401,406 | 3/1995 | Johnson et al. ....................... 210/323.2 |
| 5,730,769 | 3/1998 | Dungs et al. . |
| 5,904,357 | 5/1999 | Demirdogen et al. ................... 210/450 |

FOREIGN PATENT DOCUMENTS 34 39 194  4/1986  Germany .

OTHER PUBLICATIONS

Webster's New World Dictionary, Third College Edition © 1988 by Simon & Schuster, Inc. p. 380.

*Primary Examiner*—Robert J. Popovics
*Attorney, Agent, or Firm*—Kenyon & Kenyon

[57] ABSTRACT

A filter cartridge, including a tubular filter element which encloses an interior space on the downstream, clean air side, is joined in the axial direction on one side to a side-face lid, forming a seal. In order to reduce pressure peaks which occur in the filter element on the clean air side, the lid has a diaphragm which is capable of vibrating.

9 Claims, 2 Drawing Sheets

FILTER CARTRIDGE HAVING VIBRATABLE DIAPHRAGM

BACKGROUND OF THE INVENTION

The invention relates to a filter cartridge in which a tubular filter element encloses an interior space on the downstream (clean air) side of the filter element. At least one axial side face of the filter element is joined to a side-face lid, forming a seal.

A filter cartridge of this type is described in German Patent No. 34 39 194 C2. The lids shown in that reference are intended to exhibit a high level of stability and tear resistance, and therefore are made of a plastic casting compound.

SUMMARY OF THE INVENTION

This invention is directed to the further development of a filter cartridge of the type described above, so that damage to and/or destruction of the filter cartridge is reliably avoided even when the filter element is subjected to pressure peaks on its downstream side.

The present invention improves upon known designs by providing a tubular, hollow filter cartridge that is provided on its axial side face with a lid that has a diaphragm that is capable of vibrating in a manner that reduces pressure peaks which occur in the filter element on the downstream side. Such pressure peaks can arise during cleaning of the filter. The resistance to pressure peaks enables the filter to be cleaned in a particularly reliable and efficient manner. The danger of damage to the filter cartridge due to excess levels of pressure that are applied during cleaning procedures is held to a minimum by the structure taught in this invention.

During use of the filter cartridge in accordance with its intended purpose, a pressure gradient is applied from the dusty upstream air side to the interior, clean air downstream side of the filter element. The number of particles that are filtered out and accumulate on the upstream side of the filter element rises during the use of the filter element. From time to time, the filter element must be cleaned of these accumulated particles, in order to restore the filter to its original operating characteristics. An indicator for the increasing accumulation of particles on the outside of the filter element is, for example, the increasing pressure difference between the upstream side and the downstream air side. After a pre-determined pressure difference has been exceeded, the filter cartridge is cleaned by applying a sudden level of excess pressure to the surface of the clean air, downstream side on the interior of the filter, which blows the upstream side surface clean. If, in connection with the filter cartridge known from the state of the art, the cleaning pressure is too high and/or the filter element has too low a flow permeability because of contamination, there is the risk that the filter element, which is usually made of a non-woven material, will be damaged and/or destroyed when excess pressure is suddenly applied to the downstream side.

Because the invention provides that the lid have a diaphragm which is structured to be capable of vibrating, undesirably high pressure peaks in the interior of the filter on the clean air downstream side are reduced, without the material of the filter element being subjected to impermissibly high mechanical stress which would reduce its useful lifetime.

The vibrating diaphragm is particularly effective in damping both pressure peaks and pressure pulsations.

In accordance with a further advantageous aspect of the invention, the filter element employed is pleated, the diaphragm being arranged centrally in the lid, radially within the pleats. Here it is advantageous that a comparatively small-volume filter element has a comparatively large filter surface because of its pleated structure. Due to the central placement of the diaphragm radially within the pleats, the pressure peaks on the downstream side reach the diaphragm by the shortest path.

Preferably, the entire filter cartridge is structured to have rotational symmetry, such as that of a cylinder. Such a design is of particular advantage in terms of production technology and for providing good usage properties. By using a hollow cylindrical shape, the spaces between pleats of a filter element so structured are uniform in the circumferential direction. This provides uniformly good dust separation from the gaseous medium that is to be filtered along the entire surface.

In accordance with a further aspect of the invention, the diaphragm can be in the form of a rolling diaphragm. With such a design, a high level of back and forth mobility of the diaphragm in the axial direction is provided, so that even pressure peaks with high amplitudes are reduced by a corresponding deflection of the diaphragm. Damage to the filter-element material is thereby avoided.

In order to produce the filter cartridge in a simple and cost-effective manner in terms of production technology and economics, the lid and the diaphragm are preferably configured integrally and continuously with one another, and are made of the same material. Preferably, the lid is composed of a non-woven material which can be deep-drawn.

In this connection it is advantageous that the lid and the diaphragm are produced together, in the same work step.

In order to ensure that the medium to be filtered flows essentially through the filter element and not exclusively through the diaphragm of the lid, it is necessary that the diaphragm have a flow resistance which is at least as great as or greater than the flow resistance of the pleats, as needed.

According to a first embodiment, the diaphragm may be flow-permeable. In this connection it is advantageous that the reduction of pressure peaks takes place not only by the back and forth mobility of the diaphragm, but also by blowing the excess pressure out through the diaphragm. In this case, the diaphragm is structured as a pressure relief valve. In addition, the flow-permeable diaphragm increases the effective filter surface of the filter cartridge.

According to another embodiment, the diaphragm can be impermeable to flow-through. Such a structure is used if the pressure peaks are comparatively lower than in connection with the embodiment described above, and if a connection from the dusty air (upstream) region to the clean air (downstream) region through the diaphragm must be avoided in every case, for example in order to achieve defined and calculable flow conditions through the filter cartridge.

Preferably, the diaphragm is surrounded on the outside by a U-shaped groove in the lid, the groove being open in the direction of the filter element, the groove surrounding the ring-shaped face of the filter element, and the filter element and the lid being joined by a casting compound provided in the groove.

A method for the production of the filter cartridge, in which the ring-shaped face of the filter element is embedded in a casting compound and provided with the lid, contains the following steps: the casting compound is filled into the U-shaped groove in the liquid state, and subsequently the face is dipped into the casting compound, which is still liquid, and subsequent to hardening of the casting compound, a permanent connection has been formed between the lid and the filter element.

BRIEF DESCRIPTION OF THE DRAWINGS

The filter cartridge according to the invention will be described in greater detail below, with reference to FIGS. 1 to 4. These schematic representations of the invention are further discussed below.

DETAILED DESCRIPTION

Figure 1:
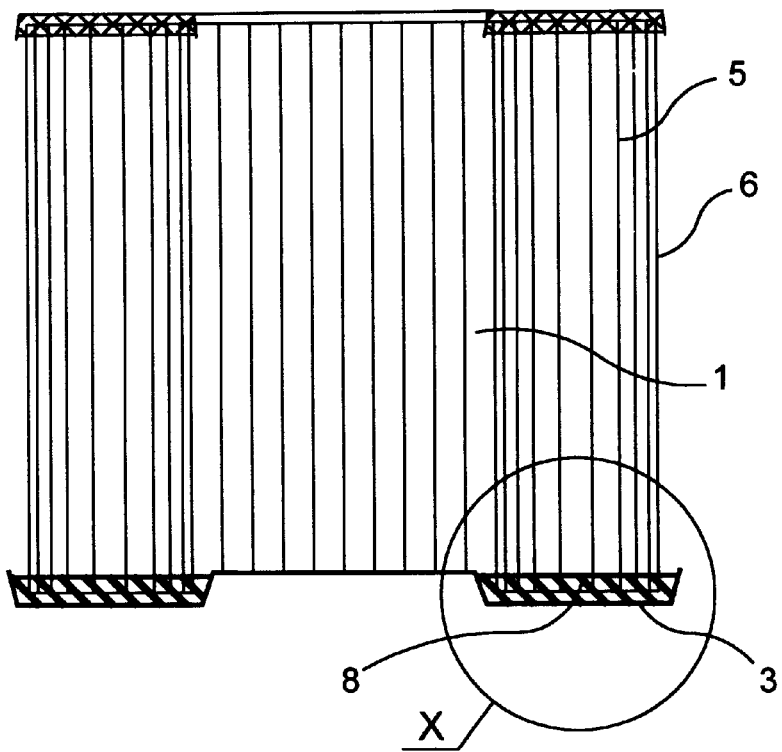
FIG. 1 is a cross-sectional view taken through a completed filter cartridge constructed according to the principles of the invention.

FIG. 1 shows a hollow, cylindrically shaped filter cartridge which is structured as a pleated filter. One of faces 8 of filter element 1 is covered by a lid 3.

Figure 2:
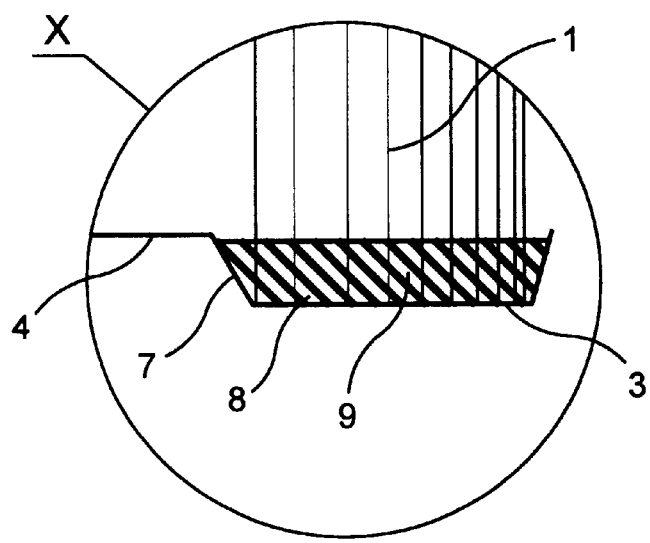
FIG. 2 is enlarged detailed view of a portion X of FIG. 1 taken in the region of the connection between the lid and the adjacent face of the filter element.

FIG. 2 shows an enlarged detail region X from FIG. 1. Lid 3 is provided with a centrally arranged diaphragm 4. Diaphragm 4 is surrounded on the outside circumference side by a U-shaped groove 7 of lid 3. The groove is open in the direction of the filter element, with a rolling-diaphragm type of connection being provided, which connects lid 3 and diaphragm 4. In this embodiment, lid 3 and diaphragm 4 are configured integrally and continuously with one another of the same material, and are made of a non-woven material.

Groove 7 is almost completely filled with casting compound 9, and surrounds face 8 of filter element 1, forming a seal. Casting compound 9 can be made of a synthetic resin, such as polyurethane resin. Such a resin is easy to work, easy to cast, and inexpensive. According to another embodiment, the synthetic resin can be an epoxy resin. In this connection it is advantageous that epoxy resin is temperature-resistant and guarantees a secure connection between face 8 and lid 3 in a temperature range from −30 to 150° C.

Figure 3:
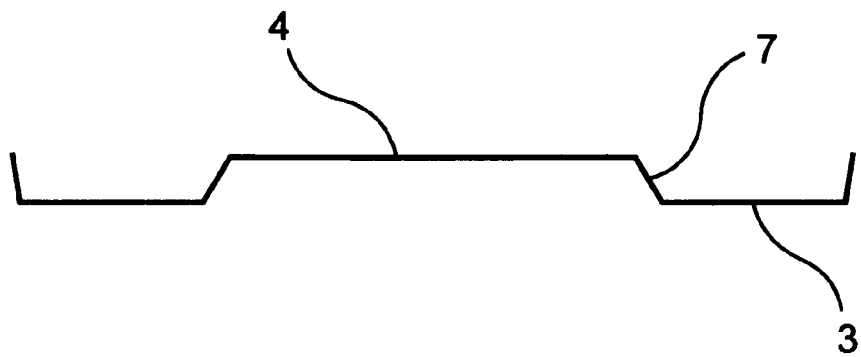
FIG. 3 is a cross-sectional view taken through the lid of the filter cartridge shown in FIG. 1.

FIG. 3 is a cross-sectional view of the lid shown in FIGS. 1 and 2, constructed as a single part. Diaphragm 4, the rolling-diaphragm-type connection region, and groove 7 of lid 3 are configured integrally and continuously with one another, and are made of the same material.

Figure 4:
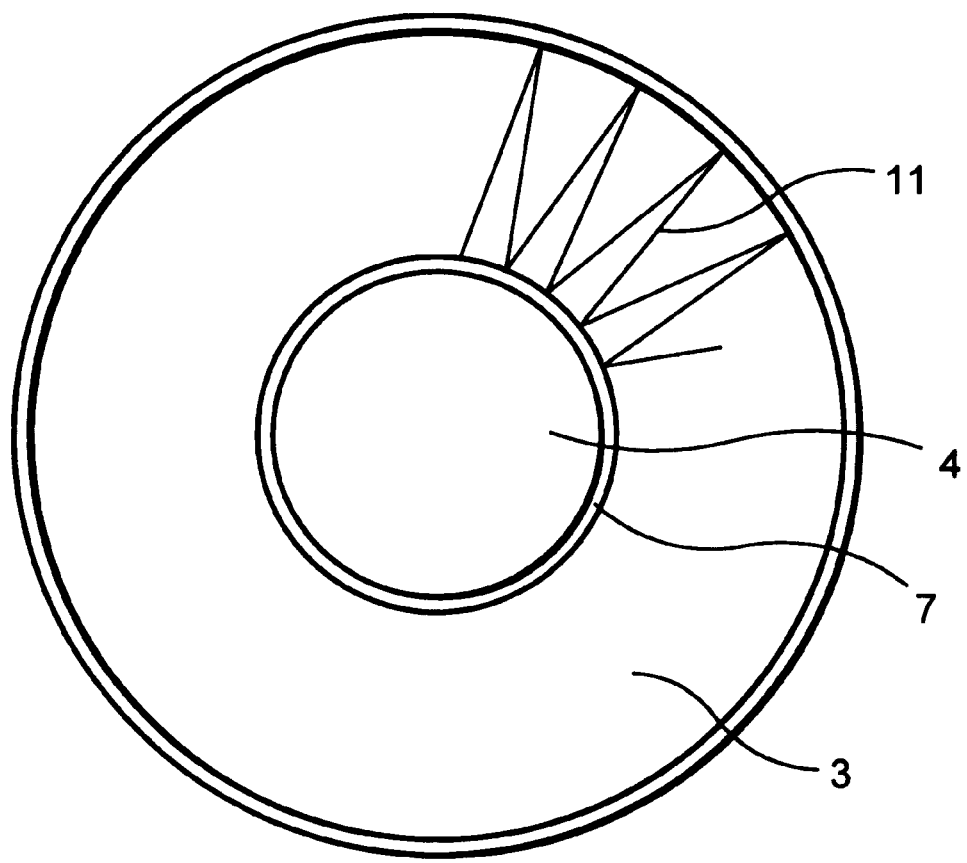
FIG. 4 is a plan view of the lid shown in FIG. 2.

FIG. 4 is a partial, cut-away view of lid 3 from FIG. 3. Lid 3 extends in the radial direction without any sudden changes in direction. The durability, particularly in the region of rolling diaphragm 11 and its connection to diaphragm 4 and groove 7, is very good due to this aspect of the design.

What is claimed is:

1. A filter cartridge comprising:

a tubular pleated filter element having a side-face, an exterior upstream air side and an interior downstream air side, the interior downstream side facing an interior space into which filtered air can flow; and a lid having an air permeable diaphragm arranged centrally in the lid and radially within pleats of said pleated filter element that is capable of vibrating, said lid being sealingly joined to the side-face of the filter element so that vibrations of the lid diaphragm serve to reduce pressure peaks which may arise in the filter element on the downstream air side.

2. A filter cartridge as set forth in claim 1, wherein the diaphragm is structured as a rolling diaphragm.

3. A filter cartridge as set forth in claim 2, wherein the lid and the diaphragm are configured integrally and continuously with one another, and are made of the same material.

4. A filter cartridge as set forth in claim 2, wherein the diaphragm has a flow resistance which is greater than the flow resistance of the pleats.

5. A filter cartridge as set forth in claim 1, wherein the lid and the diaphragm are configured integrally and continuously with one another, and are made of the same material.

6. A filter cartridge as set forth in claim 1, wherein the lid is made of a non-woven material which can be formed by a deep-drawing process.

7. A filter cartridge as set forth in claim 6, wherein the diaphragm has a flow resistance which is greater than the flow resistance of the pleats.

8. A filter cartridge as set forth in claim 1, wherein the diaphragm has a flow resistance which is greater than the flow resistance of the pleats.

9. The filter cartridge as set forth in claim 1, wherein the diaphragm is circumferentially surrounded by a U-shaped groove in the lid, the groove being open in the direction of the filter element, the side-face of the filter element is ring-shaped and the groove surrounds the ring-shaped face of the filter element, and the filter element and the lid are joined by a casting compound located in the groove.

* * * * *